(12) United States Patent
Gorobets (10) Patent No.: US 7,464,216 B2
(45) Date of Patent: Dec. 9, 2008

(54) METHOD FOR PHASED GARBAGE COLLECTION WITH STATE INDICATORS

(75) Inventor: Sergey Anatolievich Gorobets, Edinburgh (GB)

(73) Assignee: SanDisk Corporation, Milpitas, CA (US)

(*) Notice: Subject to any disclaimer, the term of this patent is extended or adjusted under 35 U.S.C. 154(b) by 225 days.

(21) Appl. No.: 11/540,778

(22) Filed: Sep. 29, 2006

(65) Prior Publication Data
US 2008/0082596 A1 Apr. 3, 2008

(51) Int. Cl.
*G06F 12/00* (2006.01)
(52) U.S. Cl. .............. 711/103; 711/154; 711/156; 711/165
(58) Field of Classification Search .......... 711/103, 711/154, 165, 156
See application file for complete search history.

(56) References Cited

U.S. PATENT DOCUMENTS

| | | | | |
|---|---|---|---|---|
| 5,640,529 | A | 6/1997 | Hasbun | 711/103 |
| 6,510,440 | B1 | 1/2003 | Alpern et al. | 707/206 |
| 6,792,601 | B1 | 9/2004 | Dimpsey et al. | 718/102 |
| 7,114,045 | B1 | 9/2006 | Pliss et al. | 711/159 |
| 7,287,049 | B1 | 10/2007 | Printezis et al. | 707/206 |
| 2001/0023472 | A1 | 9/2001 | Kubushiro et al. | 711/103 |
| 2005/0141312 | A1 | 6/2005 | Sinclair | |
| 2006/0161724 | A1 | 7/2006 | Bennett | 711/103 |
| 2006/0161728 | A1 | 7/2006 | Bennett | |
| 2007/0033324 | A1 | 2/2007 | Sinclair | 711/103 |
| 2008/0034174 | A1 | 2/2008 | Traister et al. | 711/159 |
| 2008/0034175 | A1 | 2/2008 | Traister et al. | 711/103 |
| 2008/0082728 | A1 | 4/2008 | Traister et al. | 711/159 |
| 2008/0082775 | A1 | 4/2008 | Gorobets | 711/159 |
| 2008/0086619 | A1 | 4/2008 | Traister et al. | 711/103 |
| 2008/0091872 | A1 | 4/2008 | Bennett et al. | 711/103 |

FOREIGN PATENT DOCUMENTS

| WO | WO2005/045683 | 5/2005 |
|---|---|---|
| WO | WO2006/065655 | 6/2006 |

OTHER PUBLICATIONS

ISA International Search Report and Written Opinion dated Apr. 24, 2008 in related International Application No. PCT/US2007/0078817 (14 pages).
USPTO Notice of Allowance and Fee(s) Due mailed Jul. 1, 2008, 2008 in U.S. Appl. No. 11/499,606 (SNDKP543).
USPTO Notice of Allowance and Fee(s) Due mailed Jun. 23, 2008, 2008 in U.S. Appl. No. 11/499,598 (SNDKP543A).
USPTO Notice of Allowance and Fee(s) Due mailed Aug. 8, 2008 in U.S. Appl. No. 11/541,371 (SNDKP544A).
USPTO Notice of Allowance and Fee(s) Due mailed Jul. 17, 2008 in U.S. Appl. No. 11/541,035 (SNDKP551).
USPTO Notice of Allowance and Fee(s) Due mailed Jul. 16, 2008 in U.S. Appl. No. 11/541,012 (SNDKP551A).

*Primary Examiner*—Jack A Lane
(74) *Attorney, Agent, or Firm*—Weaver Austin Villeneuve Sampson LLP (57) ABSTRACT

A method for phased garbage collection is described, the method including receiving a write command to write a memory write to a metablock, performing a first portion of a garbage collection operation, and storing the memory write in a buffer portion of the metablock.

15 Claims, 11 Drawing Sheets

Fig. 10 ure. The scope is limited only by the claims and numerous
METHOD FOR PHASED GARBAGE COLLECTION WITH STATE INDICATORS

CROSS-REFERENCES TO RELATED APPLICATIONS

This application is related to U.S. patent application Ser. No. 11/541,371, filed on Sep. 29, 2006, and entitled "System for Phased Garbage Collection;" is related to U.S. patent application Ser. No. 11/541,035 filed on Sep. 28, 2006, and entitled "Methods for Phased Garbage Collection Using Phased Garbage Collection Block or Scratch Pad Block as a Buffer;" is related to U.S. patent application Ser. No. 11/541,012, filed on Sep. 28, 2006, and entitled "Memory Systems for Phased Garbage Collection Using Phased Garbage Collection Block or Scratch Pad Block as a Buffer;" is related to U.S. patent application Ser. No. 11/040,325, filed on Jan. 20, 2005, and entitled "Scheduling of Housekeeping Operations in Flash Memory Systems;" is related to U.S. application Ser. No. 11/499,606, filed on Aug. 4, 2006, and entitled "Methods for Phased Garbage Collection;" and is related to U.S. patent application Ser. No. 11/499,598, filed on Aug. 4, 2006, and entitled "Non-Volatile Memory Storage Systems for Phased Garbage Collection," the disclosures of which are incorporated herein by reference.

FIELD OF THE INVENTION

The present invention relates generally to memory operations and, more particularly, to methods and systems for performing phased garbage collection operations.

BACKGROUND

In non-volatile memory systems, blocks of data stored in the memory are periodically garbage collected (i.e., compacted or consolidated) to reclaim a memory's storage capacity. In a typical garbage collection operation, valid data from one or more blocks are copied to another block. After the valid data are transferred, the original one or more blocks is erased to provide storage capacity. Currently, a write operation can trigger a memory system to perform a garbage collection operation. The host allows a fixed amount of time for the execution of the write operation and the garbage collection operation. For example, the Secure Digital protocol limits the amount of time to 250 milliseconds. A timeout error can result if the memory system exceeds this fixed amount of time in a write operation.

The sizes of memory blocks have been increasing due to increased capacity, higher parallelism, and die size scaling. Accordingly, execution of write operations and the performance of garbage collection operations are taking longer because more data are transferred. A garbage collection operation can therefore easily exceed the fixed amount of time allocated to the write operation. As a result, there is a need to prevent the timeout errors when the amount of time to perform a garbage collection operation exceeds the fixed amount of time.

SUMMARY

Various embodiments of the present invention provide methods and/or systems for phased garbage collection. It should be appreciated that the embodiments can be implemented in numerous ways, including as a method, a circuit, a system, or a device. Several embodiments of the present invention are described below.

In accordance with an aspect of the present invention, phased garbage collection is described. Phased garbage collection may include receiving a write command to write a memory write to a metablock, performing a first portion of a garbage collection operation, and storing the memory write in a buffer portion of the metablock.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

A detailed description of one or more embodiments is provided below along with accompanying figures. The detailed description is provided in connection with such embodiments, but is not limited to any particular embodiment. The scope is limited only by the claims and numerous alternatives, modifications, and equivalents are encompassed. Numerous specific details are set forth in the following description in order to provide a thorough understanding. These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

The embodiments described herein provide methods and/or systems for phased garbage collection. In general, a garbage operation can be split into multiple phases. The phases (or portions) of the garbage collection operation can be performed over multiple timeout periods. In an embodiment, as will be explained in more detail below, a portion of a garbage collection operation is performed within one timeout period and the data received from the write command may be stored in a buffer portion of a metablock of a memory.

Figure 1:
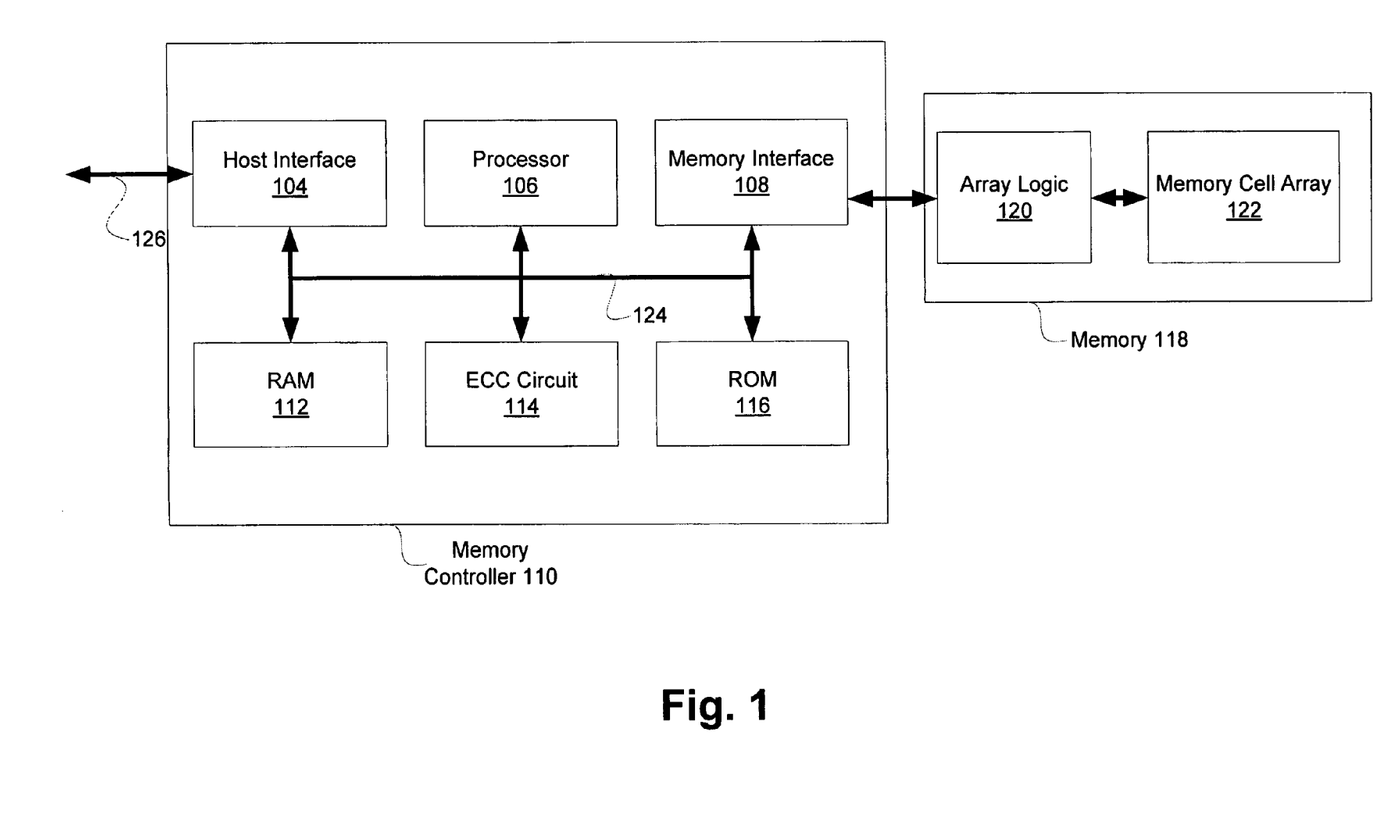
FIG. 1 is a simplified block diagram of an example of a non-volatile memory storage system, in accordance with an embodiment of the present invention.

FIG. 1 is a simplified block diagram of an example of a non-volatile memory storage system, in accordance with an embodiment of the present invention. A host system (e.g., desktop computers, audio players, digital cameras, and other computing devices) may write data to and read data from non-volatile memory storage system 102. Non-volatile memory storage system 102 may be embedded within the host or removably connected to the host. As shown in FIG. 1, non-volatile memory storage system 102 includes memory controller 110 in communication with memory 118. In general, memory controller 110 controls the operation of memory 118. Examples of operations include writing (or programming) data, reading data, erasing data, verifying data, attending to garbage collection operations, and other operations. Memory controller 110 includes bus 124 that interfaces with system bus 126 through host interface 104 and the memory controller interfaces with memory 118 through memory interface 108. In communication with bus 124 include host interface 104, processor 106 (e.g., microprocessor, microcontrollers, and other processors), memory interface 108, random access memory (RAM) 112, error correcting code (ECC) circuit 114, and read-only memory (ROM) 116. ROM 116 can store a storage system firmware that includes program instructions for controlling the operation of memory 118. Processor 106 is configured to execute the program instructions loaded from ROM 116. The storage system firmware may be temporarily loaded into RAM 112 and additionally, the RAM 112 may be used to buffer data that are transferred between a host and memory 118. ECC circuit 114 can check for error passing through memory controller 110 between the host and memory 118. If errors are found, ECC circuit 114 can correct a number of error bits, the number depending on the ECC algorithm utilized.

Memory 118 can include array logic 120 and non-volatile memory cell array 122. Non-volatile memory cell array 122 may include a variety of non-volatile memory structures and technologies. Examples of non-volatile memory technologies include flash memories (e.g., NAND, NOR, Multi-Level Cell (MLC), Divided bit-line NOR (DINOR), AND, high capacitive coupling ratio (HiCR), asymmetrical contactless transistor (ACT), other flash memories), erasable programmable read-only memory (EPROM), electrically-erasable programmable read-only memory (EEPROM), read-only memory (ROM), and other memory technologies.

Figure 2:
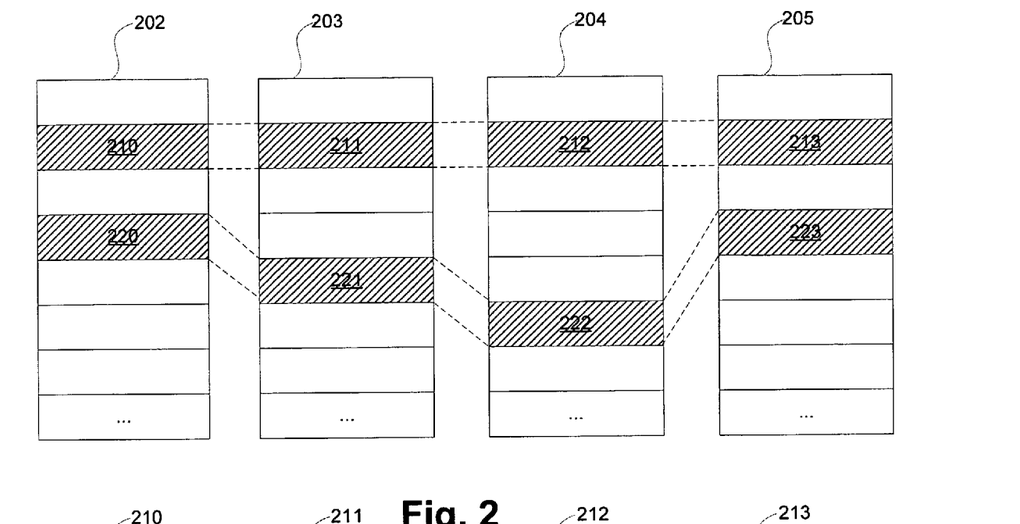
FIG. 2 is a simplified block diagram of an organization of the memory cell array into planes.
Figure 3:
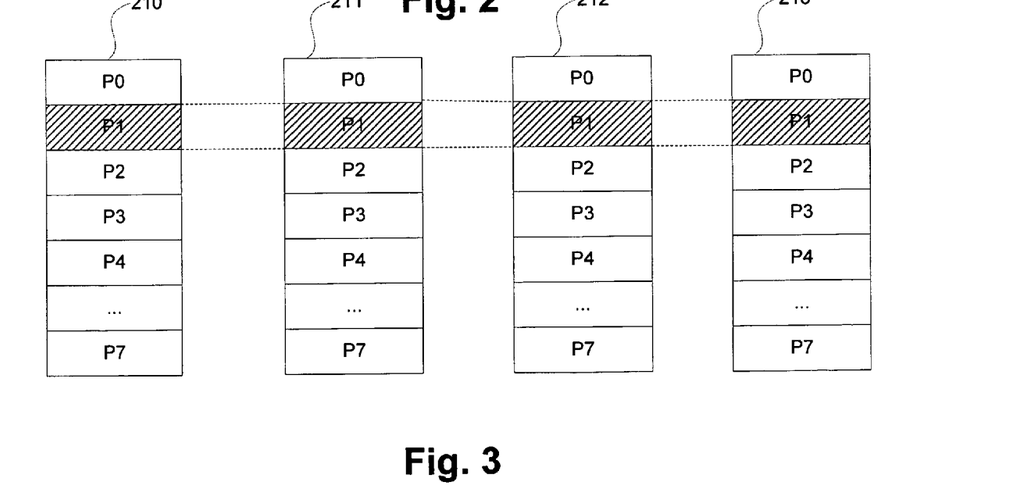
FIG. 3 is a simplified block diagram of pages of memory cells.

According to an embodiment, the memory cell array 122 includes memory arranged into both physical and logical groups (see FIGS. 2 and 3, for example). The logical groups of the memory cell array 122 may include a buffer portion used to implement phased garbage collection. For example, a logical group of the memory cell array 122 may include a portion for storing data, and another portion for buffering memory writes during garbage collection. The logical group is described further regarding FIG. 8B.

Array logic 120 interfaces memory controller 110 with non-volatile memory cell array 122 and can provide, for example, addressing, data transfer and sensing, and other support to the non-volatile memory cell array and the memory cell array. To support non-volatile memory cell array 122, array logic 120 can include row decoders, column decoders, charge pumps, word line voltage generators, page buffers, input/output buffers, address buffers, and other circuitries.

FIG. 2 is a simplified block diagram of an organization of the memory cell array into planes. One or more memory cell arrays may be divided into multiple planes or sub-arrays. In the example of FIG. 2, a memory cell array is divided into four planes 202-205. It should be appreciated that other number of planes, such as 1, 2, 8, 16, or more, can exist in a non-volatile memory storage system. Each plane 202, 203, 204, or 205 may be divided into blocks of memory cells, such as blocks 210-213 and 220-223, located in respective planes 202-205. A block of memory cells is the smallest number of memory cells that are physically erasable together. For increased parallelism, the blocks can be operated in larger metablock units where one block from each plane 202, 203, 204, or 205 is logically linked together to form a metablock. For example, four blocks 210-213 can be logically linked together to form a metablock. Further, the blocks used to form a metablock can be from various locations within their respective planes, such as planes 202-205. For example, four blocks 220-223 from various locations within their respective planes 202-205 can be logically linked together to form another metablock. A metablock may extend across all four logical planes 202-205 within the non-volatile memory storage system or the non-volatile memory storage system can dynamically form metablocks from one or more blocks in one or more different planes.

FIG. 3 is a simplified block diagram of pages of memory cells. Each block, such as each of the blocks 210-213, is further divided into pages of memory cells. As shown in FIG. 3, each block 210, 211, 212, or 213 is divided into eight pages P0-P7. Alternatively, there can be 16, 32, or more pages of memory cells within each block 210, 211, 212, or 213. To increase the operational parallelism of the non-volatile memory storage system, the pages within two or more blocks may be logically linked into metapages. For example, a metapage can be formed of one page, such as P1, from each of four blocks 210-213. A metapage can extend across all planes within the non-volatile memory storage system or the non-volatile memory storage system can dynamically form metapages from one or more pages in one or more separate blocks in one or more different planes.

Figure 4:
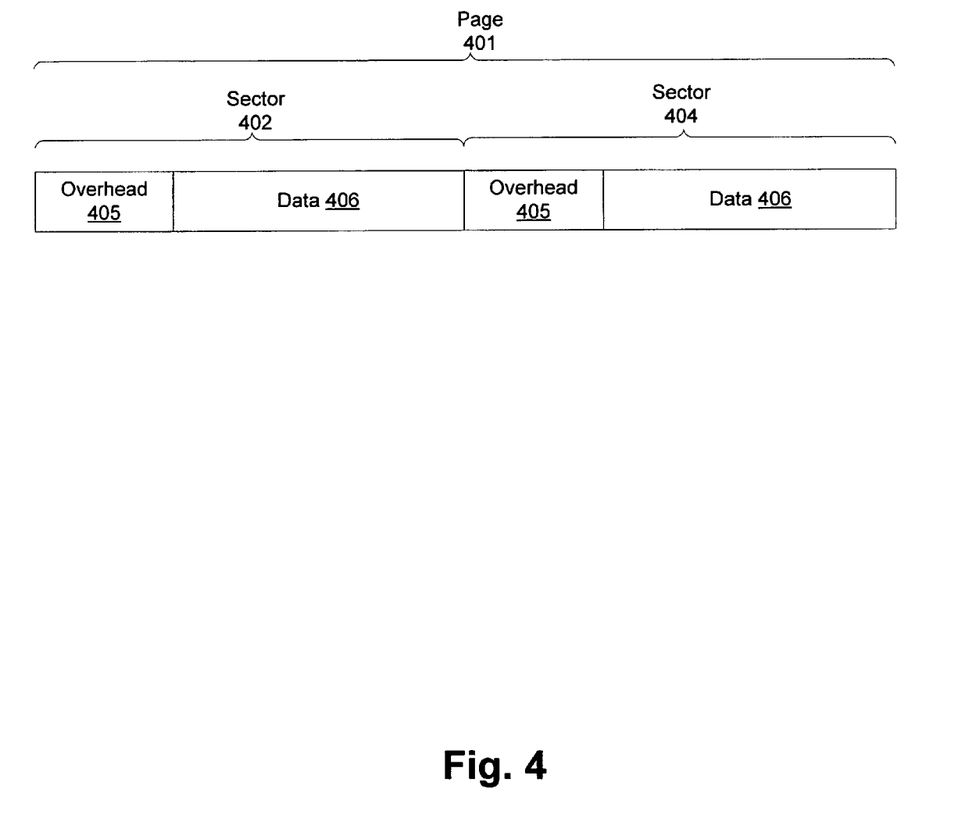
FIG. 4 is a simplified block diagram of sectors of memory cells.

FIG. 4 is a simplified block diagram of sectors of memory cells. A page can be further divided into one or more sectors. The amount of data in each page can be an integer number of one or more sectors of data, where each sector may store 512 bytes of data. FIG. 4 shows page 401 divided into two sectors 402 and 404. Each sector 402 or 404 contains data 406, which can be 512 bytes in size, and overhead data 405 associated with the data. The size of overhead data 405 can be 16 bytes and can store, for example, an ECC calculated from data 406 during programming, the logical address associated with the data, a count of the number of times the block has been erased and re-programmed, control flags, operating voltage levels, and other information associated with the data.

Figure 5:
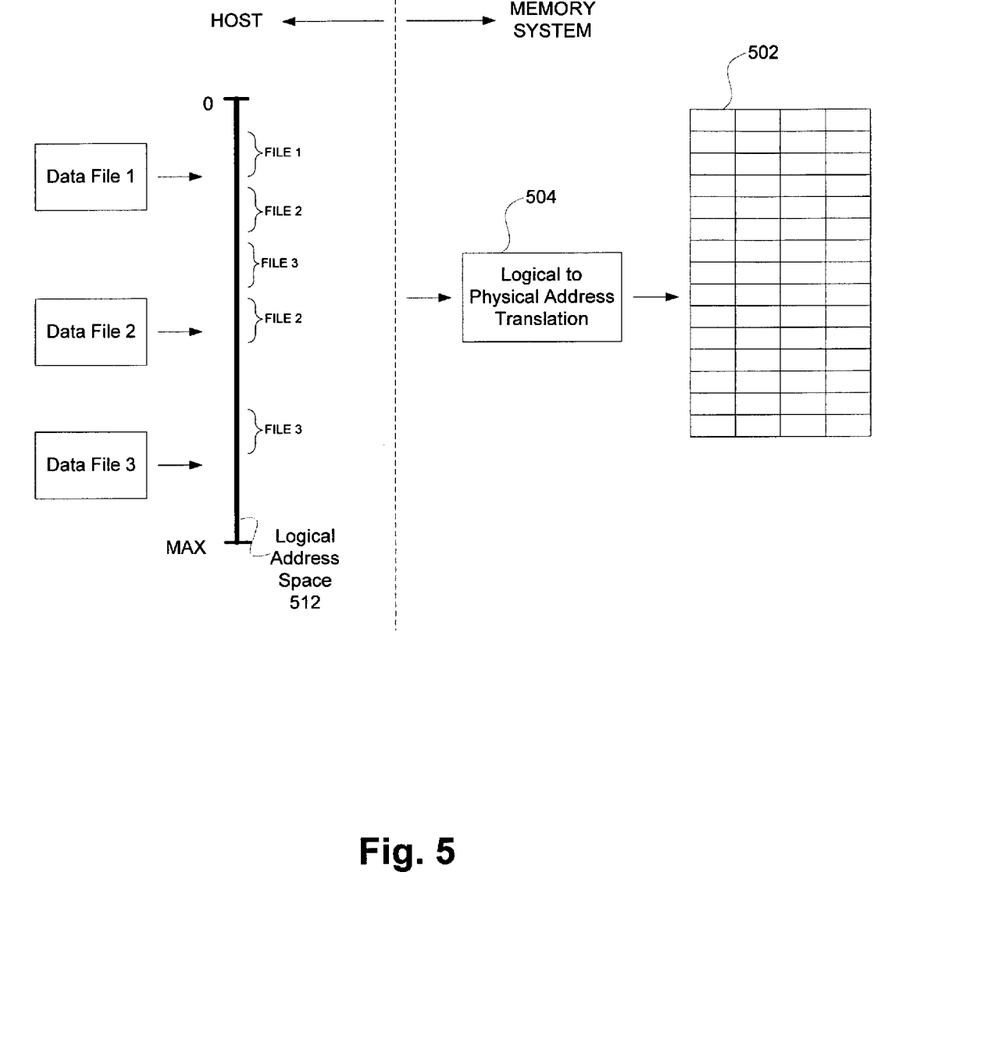
FIG. 5 is a simplified block diagram of a logical interface between a host and a non-volatile memory storage system.

FIG. 5 is a simplified block diagram of a logical interface between a host and non-volatile memory storage system. A continuous logical address space 512 provides addresses for data that can be stored in memory. Logical address space 512 as viewed by the host can be divided into increments of clusters of data. Each cluster may include a number of sectors of data, such as between 4 and 64 sectors.

As shown in FIG. 5, an application program executed on the host creates three data files 1, 2, and 3. Files 1, 2, and 3 can be an ordered set of data and are identified by a unique name or other reference. The host assigns a logical address space to file 1 that is not already allocated to other files. Here, file 1 is shown to have been assigned a continuous range of available logical addresses.

When host creates file 2 after file 1, the host similarly assigns two different ranges of continuous addresses within logical address space 512. Host may not assign a continuous logical address to a file, such as file 1, 2, or 3, but can rather assign fragments of logical addresses in between logical address ranges already allocated to other files. The example of FIG. 5 shows that another file 3 is allocated other portions of logical address space 512 not previously allocated to files 1 and 2 and other data.

The host can keep track of logical address space 512 by maintaining a file allocation table (FAT), where the logical addresses assigned by the host to the various data files, such as files 1-3, by conversion are maintained. The host references files 1-3 by their logical addresses and not by the physical locations where the non-volatile memory storage system stores the files. On the other hand, the non-volatile memory storage system references files 1-3 by portions of the logical addresses to which data have been written and does not reference the files by the logical addresses allocated to the files. The non-volatile memory storage system converts the logical addresses provided by the host into unique physical addresses within memory cell array 502 where data from the host are stored. Block 504 represents a table of these logical-to-physical address conversions, which is maintained by the non-volatile memory storage system.

Figure 6:
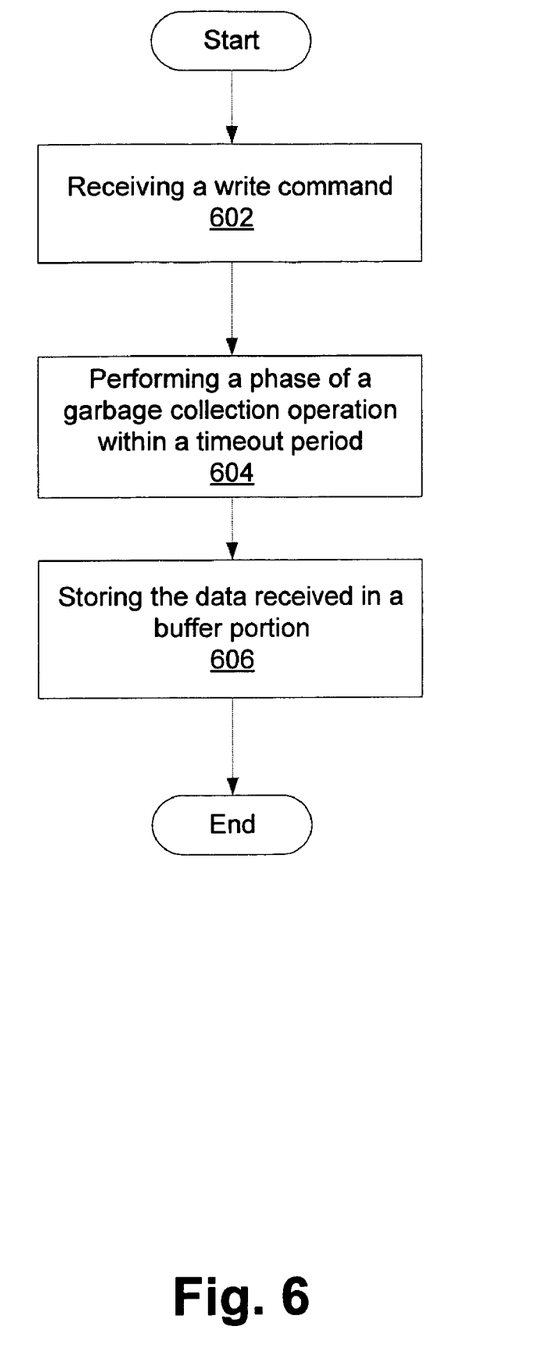
FIG. 6 is a flowchart diagram of a general overview of operations for phased garbage collection, in accordance with an embodiment of the present invention.

FIG. 6 is a flowchart diagram of a general overview of operations for phased garbage collection, in accordance with an embodiment of the present invention. It should be appreciated that data stored at specific host logical addresses can be overwritten by new data as the original stored data become obsolete. The non-volatile memory storage system, in response, writes the new data in an update block and then changes the logical-to-physical address table for those logical addresses to identify the new physical block to which the new data are stored. The blocks containing the original data at those logical addresses are then erased and made available for the storage of additional data. Such erasure can take place before a write operation. As a result, the memory controller learns that data at a given logical address have been rendered obsolete or invalid by the host after the new data are written to the same logical address. Many blocks of memory can therefore be storing invalid data for a period of time.

According to various embodiments, garbage collection may be performed to avoid host timeouts, to avoid performance drops, and to establish a smoother pattern of more frequent but shorter overhead expenditures. In general, garbage collection may be performed according to a time budget allocated to the data write operation. The budget may be defined by host timeouts, or may be simply to distribute overhead between commands and writes.

The sizes of blocks and metablocks are increasing and these increases result in a large proportion of individual data writes storing an amount of data that is less than the storage capacity of a metablock, and in many instances, even less than that of a block. Since the non-volatile memory storage system can direct new data to an erased pool metablock, such direction can result in portions of blocks or metablocks being unfilled. If the new data are updates of some data stored in another metablock, remaining valid metapages of data from that other metablock having logical addresses contiguous with those of the new data metapages may be copied in logical address order (or any other order) into the new metablock. The old metablock may retain other valid data metapages. Accordingly, data of certain metapages of an individual metablock can be rendered obsolete or invalid, and replaced by new data with the same logical address being written to a different metablock.

In order to maintain enough physical memory space to store data over a logical address space, such data can be periodically garbage collected (i.e., compacted). In general, a garbage collection operation involves reading the valid data from one or more blocks (e.g., for original and chaotic updates) and writing the valid data to a new block, ignoring invalid data in the process. The non-volatile memory storage system may perform the garbage collection operation within a timeout period allocated to a write command. If the garbage collection operation cannot be completed within one timeout period, then the one garbage collection operation may be split into several different phases (or portions), in accordance with an embodiment of the present invention. Here, the non-volatile memory storage system performs portions of the garbage collection operation using the timeout periods allocated to multiple write commands. In other words, the non-volatile memory storage system utilizes the timeout periods allocated to multiple write commands to perform portions of one garbage collection operation.

As shown in FIG. 6, a write command to write new data is received in operation 602. As used herein, the term "new data" is defined as the data received by the non-volatile memory storage system from a write command to be written to the memory. The write command may be issued to write a memory write including the new data. The write command is allocated a timeout period to complete the execution of the write command or sector write in a multiple sectors command. In other words, the timeout period is a period of time allocated for an execution of the write command. An example of a timeout period allocated is 250 milliseconds. The write command can be a single sector write command or a multiple sectors write command. In a single sector write command, new data can be written as single sectors to random addresses across a memory. In a multiple sectors write command, multiple sectors of new data having contiguous local addresses are written to the memory and each sector write may have a timeout limit.

Figure 7:
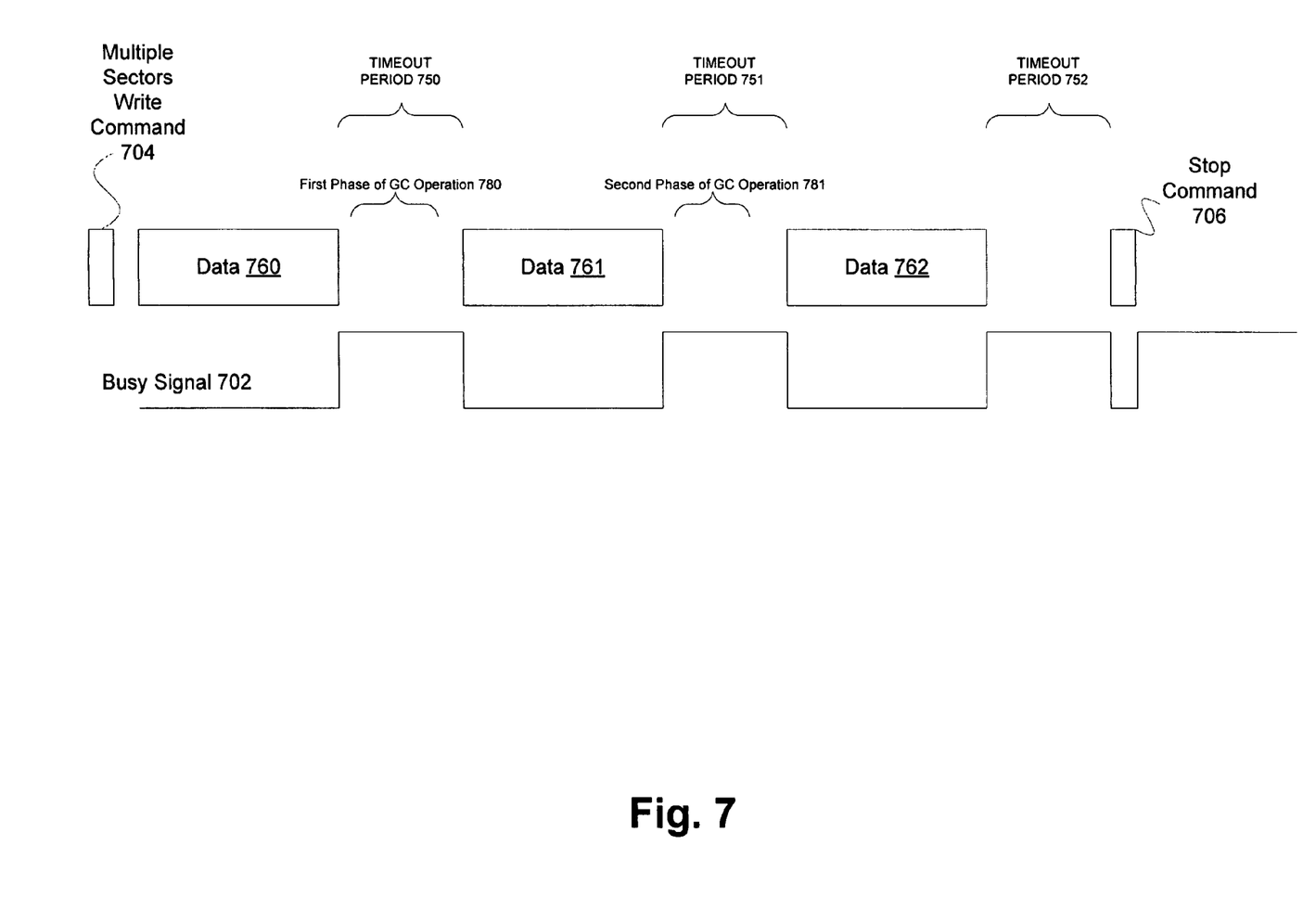
FIG. 7 shows a simplified block diagram of one garbage collection operation split into multiple portions, in accordance with an embodiment of the invention.

If one garbage collection operation cannot be completed within the timeout period, as shown in operation 604, a first phase of the garbage collection operation is performed within the timeout period allocated to the write command. According to an embodiment, and as described in more detail regarding FIG. 10, the garbage collection operation may be for the metablock to which the write command is directed, or to another metablock unrelated to the write command. The remaining phases of the garbage collection can be completed at later timeout periods. For example, FIG. 7 shows a simplified block diagram of an example of one garbage collection operation split into multiple phases 780 and 781, in accordance with an embodiment of the invention. As shown in FIG. 7, a non-volatile memory storage system receives multiple sectors write command 704 and subsequently, multiple sectors of new data 760-762 are received for storage into memory. Busy signal 702 is asserted after each sector of data 760, 761, or 762 is received to notify the memory host of the timeout period. The non-volatile memory storage system asserts busy signal 702 to allow the execution of the write command, which may include garbage collection operation (if needed), and other operations. A host does not send another command or additional data to the non-volatile memory storage system when busy signal 702 is asserted. The non-volatile memory storage system can assert busy signal 702 for a limited amount of time after each sector of data 760, 761, or 762 is received because the host allows a limited fixed amount of time (i.e., timeout periods 750-752) for the execution of the write command. If the busy signal remains active for longer than timeout period 750, 751, or 752, the host may repeat the write command or abort the process. Accordingly, the non-volatile memory storage system cannot assert busy signal 702 for more than timeout period 750, 751, or 752. Releasing busy signal 702 after the completion of writing multiple sectors of data 760-762 allows the host to communicate further with the non-volatile memory storage system.

Still referring to FIG. 7, phases 780 and 781 of the garbage collection can be allocated between multiple timeout periods 750-752. In other words, the non-volatile memory storage system can utilize each timeout period 750, 751, or 752 to perform each phase 780 or 781 of one garbage collection operation. For example, first phase 780 of one garbage collection is performed during first timeout period 750. Here, a portion of valid data can be copied from one block to another block during first timeout period 750. At second timeout period 751, the previous garbage collection operation started at first timeout period is continued. The non-volatile memory storage system performs second phase 781 of the previous garbage collection operation during timeout period 751 until the previous garbage collection is completed. The previous garbage collection can be completed by copying the remaining or last portion of the valid data from the one block to the other block. If the previous garbage collection operation cannot be completed within second timeout period 751, then the non-volatile memory storage system can use subsequent timeout periods, such as third timeout period 752, to complete the garbage collection operation. At the end of multiple sectors write command 704, the non-volatile memory storage system can assert busy signal 702 after stop command 706 is received or until all sectors of data 760-762 are written to the memory cell array.

Returning to FIG. 6, after a phase of the garbage collection operation is performed within a timeout period, the new data received from the write operation can be stored in a buffer portion of a metablock to which the new data (or memory write) are written in operation 606. According to an embodiment, the new data from the write command may be written to the buffer portion if the new data are being written to the same metablock that is currently being garbage collected. If the new data are written to a different logical group, the new data may be written to another block. According to another embodiment, the new data from the write command may be written to the buffer portion of a metablock different from the metablock currently being garbage collected. In an embodiment, the buffer portion may be part of a metablock, as described in FIG. 8B.

Figure 8A:
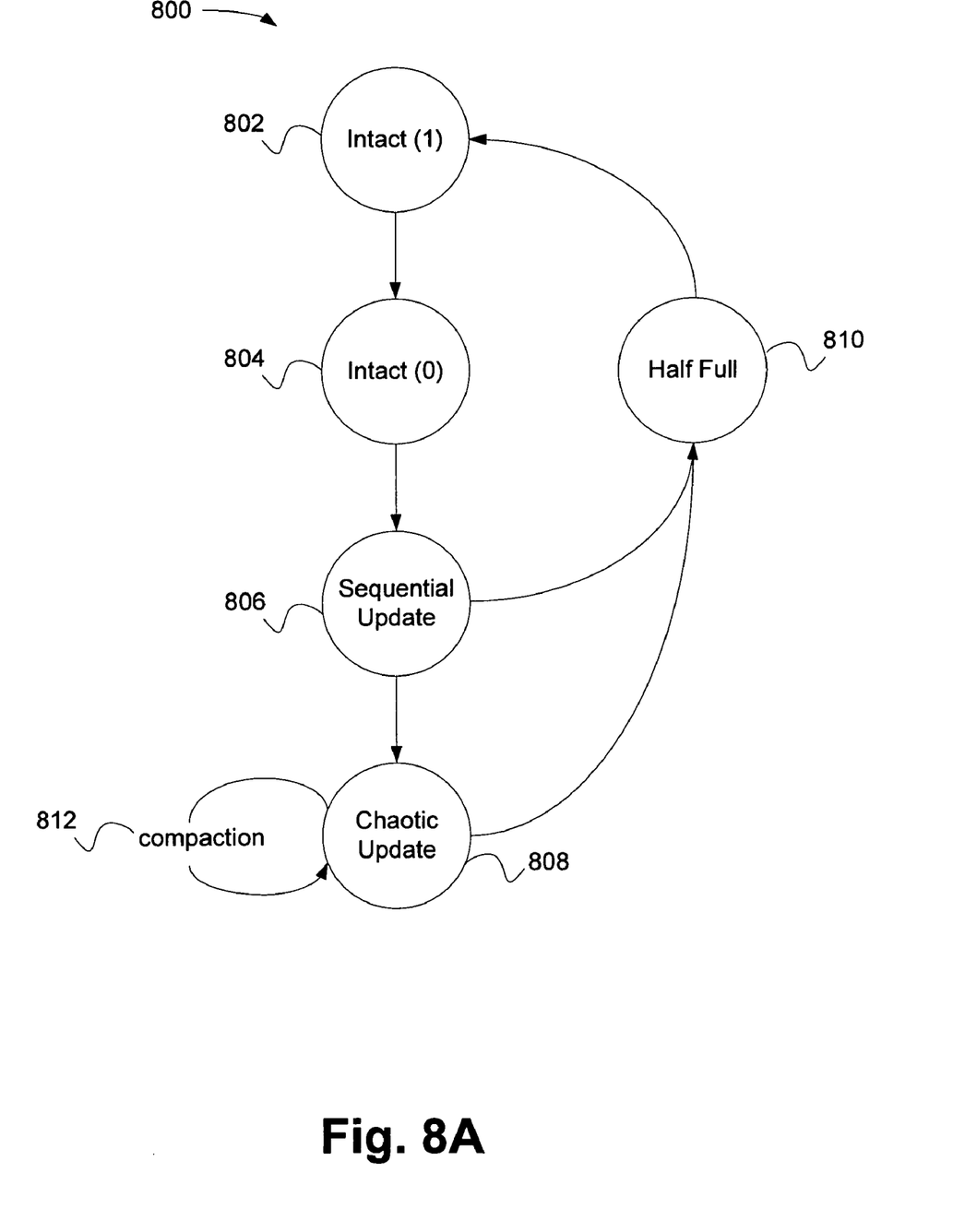
FIG. 8A illustrates a state diagram describing a multi-phase garbage collection using a buffer portion of a metablock according to an embodiment.

FIG. 8A illustrates a logical group state diagram 800 describing a phased garbage collection using a buffer portion of a metablock according to an embodiment. The phased garbage collection may be performed by progressing a logical group through several states, including an intact(1) state 802, an intact(0) state 804, a sequential update state 806, a chaotic update state 808, and a half full state 810. The multiple intact states 802 and 804, and the half full state 810 allow garbage collection to be performed over multiple timeout periods by buffering incoming memory writes. As shown here, there are two phases of garbage collection; three or more phases of garbage collection may be performed by increasing the number of buffers in the metablock, as is described below. Although logical groups are described here, it is understood that any memory arrangement may be used. Further, a memory write and garbage collection may be performed without necessarily involving every state 802-810.

As described above, garbage collection (or consolidation) may be performed when a logical group is updated and the update invalidates portions of the logical group. A logical group being updated uses two metablocks, an original block and an update block. In order to free up a block for the update block, garbage collection of another logical group is performed. A chaotic update block (e.g., one that includes a logical group that proceeds from the sequential update state 806 to the chaotic update state 808) may be compacted 812, during which garbage collection is performed using a third metablock, and then both the original and chaotic update blocks may be erased. The garbage collection process may be divided into two or more phases to avoid generating timeout errors (i.e., when the time for garbage collection exceeds the timeout period). Once the garbage collection is complete, the update block is converted to a normal, intact block, and the original block is erased and can be reused. When the update block is converted, another update block may be assigned from the pool for subsequent memory writes.

Figure 8B:
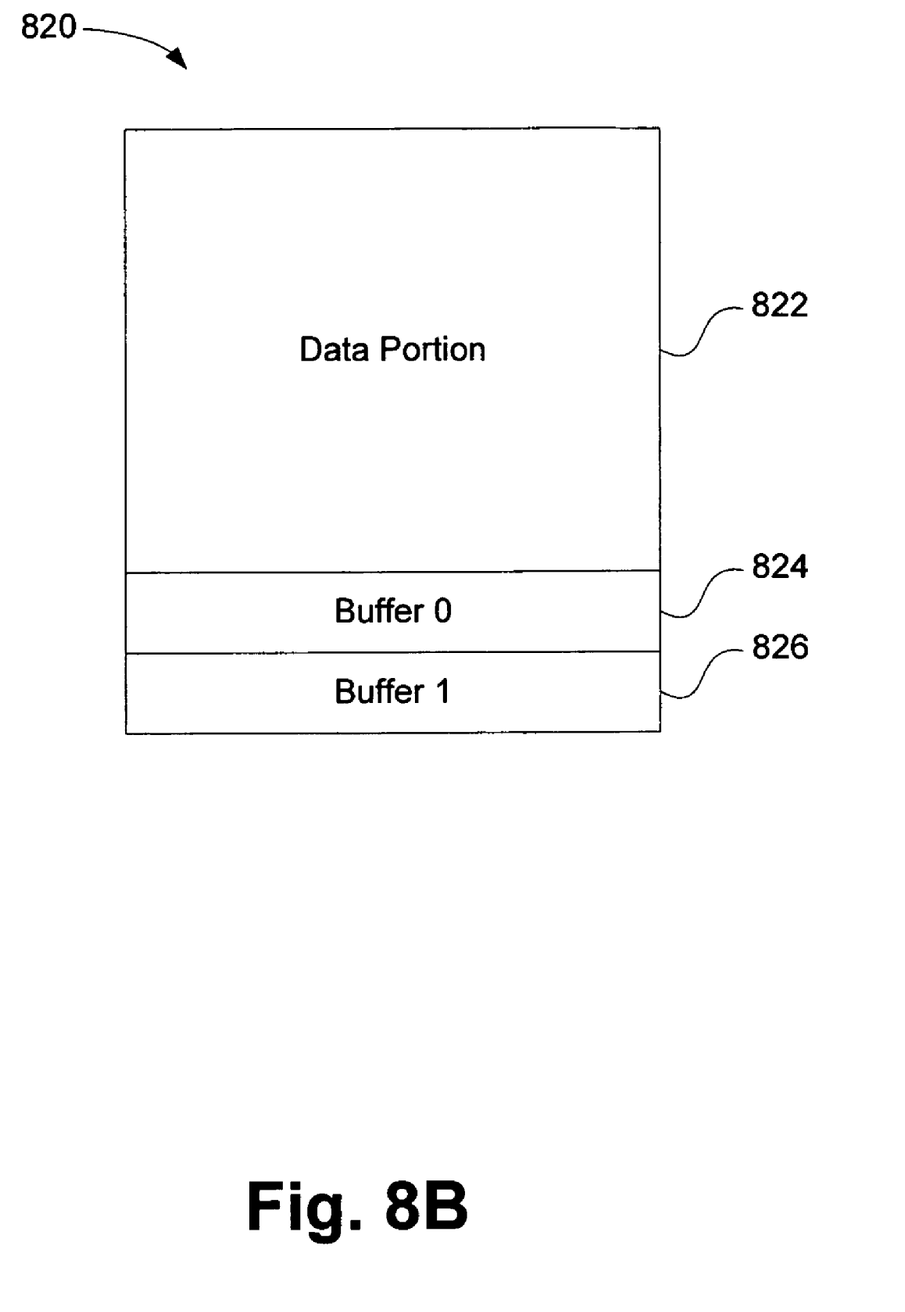
FIG. 8B illustrates a metablock including a data portion and a buffer portion according to an embodiment.

FIG. 8B illustrates a metablock 820 including a data portion and a buffer portion according to an embodiment. The metablock 820 may be used as a data storage unit within a memory system as described herein. The metablock 820 may be used to store data, as well as to buffer memory writes to enable phased garbage collection, as will be explained regarding FIGS. 9 and 10.

A logical group 822 does not map data storage 1:1 with the metablock 820. Instead, the metablock 820 includes the logical group (i.e. the data storage portion) 822, and two buffer portions 824 and 826. The buffer portions 824 and 826 may be used to implement phased garbage collection according to various embodiments.

According to an embodiment, each of the buffer portions 824 and 826 may store a single sector of memory. When a single sector memory write is received, the memory write may be written to one of the buffer portions 824 or 826 while garbage collection is performed during one or more timeout periods. The buffer portions 824 and 826 therefore hold incoming memory writes to allow the metablock 820 to be garbage collected without disrupting the incoming writes. According to another embodiment, the buffer portions 824 and 826 may be used to hold incoming memory writes while garbage collection is completed for other metablocks. There may be a limit on the number of update blocks; if there are no update blocks available, the buffer portions 824 and 826 can be used to hold incoming writes while waiting for other metablocks to finish garbage collection and make an update block available. According to other embodiments, the buffer portions 824 and 826 may be of any desired size.

One or more buffer portions of the metablock 820 may be used to implement phased garbage collection. A single buffer portion may be used to hold a memory write during garbage collection when using a two-phase garbage collection. As is explained below, a reserve buffer portion (e.g., the buffer portion 826) may optionally be added to account for some memory write scenarios.

The metablock 820 may also include additional buffer portions to allow for additional phases of garbage collection. For example, the metablock 820 may include three buffer portions, allowing three phases of garbage collection (two buffer portions to store two memory writes and a reserve buffer portion to account for certain scenarios). Additional buffer portions may be used where the duration of garbage collection may exceed the length of two timeouts. As is explained below, additional states may be added to the state diagram 800 where additional buffer portions and additional phases are used.

A logical group (e.g., the logical group 822) is in the intact(1) state 802 to indicate generally that the buffer portion may still be written to. Specifically, one additional memory write (e.g., a single sector corresponding to the size of the buffer portion 824 or 826) may be written to the buffer portion of the metablock (e.g., the metablock 820) to which the logical group belongs. A logical group is in the intact(0) state 804 when no more data may be written to the metablock. The logical group progresses from the intact(1) to the intact(0) state when a memory write to fill the buffer portion of the metablock is received.

A logical group is in the sequential update state 806 when sequential update data are added to the logical group. A sequential update block including the logical group in the sequential update state 806 may be allocated from a pool of update blocks and may include a previous single or multiple sectors write. The update block, as described above, may be consolidated with an existing (i.e., original) memory block to replace invalid data of the existing memory block with the new data of the update block. An intact(0) logical group may progress to the sequential update state 806 when a memory write updating the intact(0) logical group is received and a sequential update block is opened. The sequential update block may be separate from the metablock including the intact(0) logical group (which becomes an "original" block) that is being updated.

A sequential update block includes contiguous update data. A chaotic update block (i.e., one with a logical group in the chaotic update state 808) includes data that are either not sequential or invalid. A sequential update block may become chaotic (i.e., a logical group may progress from the sequential update state 806 to the chaotic update state 808) if another memory write adding to or invalidating portions of the sequential update block is received. The logical group of the chaotic update block may be compacted 812 to reclaim obsolete space in the chaotic update block. Compaction 812 may be performed by copying data to a third metablock, but the chaotic update block is eventually erased. Alternatively, the chaotic block may be consolidated by copying valid data from the original (intact) block and the chaotic update block to a new, third block, the logical group of which proceeds to the half full state 810, and then to the intact(1) state 802.

For example, the chaotic update block may replace invalid data with valid data and organize the update data into a sequential fashion. A logical group of a metablock may proceed through either the sequential update state 806 or the chaotic update state 808, depending on the type of update block that results.

After either the sequential update state 806 or the chaotic update state 808, the logical group is filled with a combination of data from the update block and the original block until the logical group reaches the half full state 810. The half full state 810 describes a state where the logical group includes data written such that the first phase of garbage collection is completed (e.g., the logical group may be half full). The logical group may not necessarily be half full; any amount of data may be written to the logical group by the half full state 810. After the second portion of the garbage collection, the logical group is fully written, and the logical group is returned to the intact(1) state 802. After returning to the intact(1) state 802, the original block is erased and another update block may be initiated.

According to another embodiment, the logical group 822 proceeds through the various states 802-810 in concert with other logical groups. For example, a first logical group (e.g., the logical group 822) may be in the intact(1) state 802, while another logical group is simultaneously in the sequential update state 806 or chaotic update state 808. When the first logical group progresses from the intact(1) state 802 to the intact(0) state 804, the second logical group progresses from either the sequential update state 806 or the chaotic update state 808 to the half full state 810. According to an embodiment, the intact(1) state 802 and the half full state 810 allow garbage collection functions for a memory to be partitioned into multiple phases. The intact(1) state allows the first logical group to wait before proceeding to the sequential update state 806, which gives the second logical group time to perform garbage collection in two phases. In this way, garbage collection may be divided so that it can be performed during multiple timeout periods.

Figure 9A:
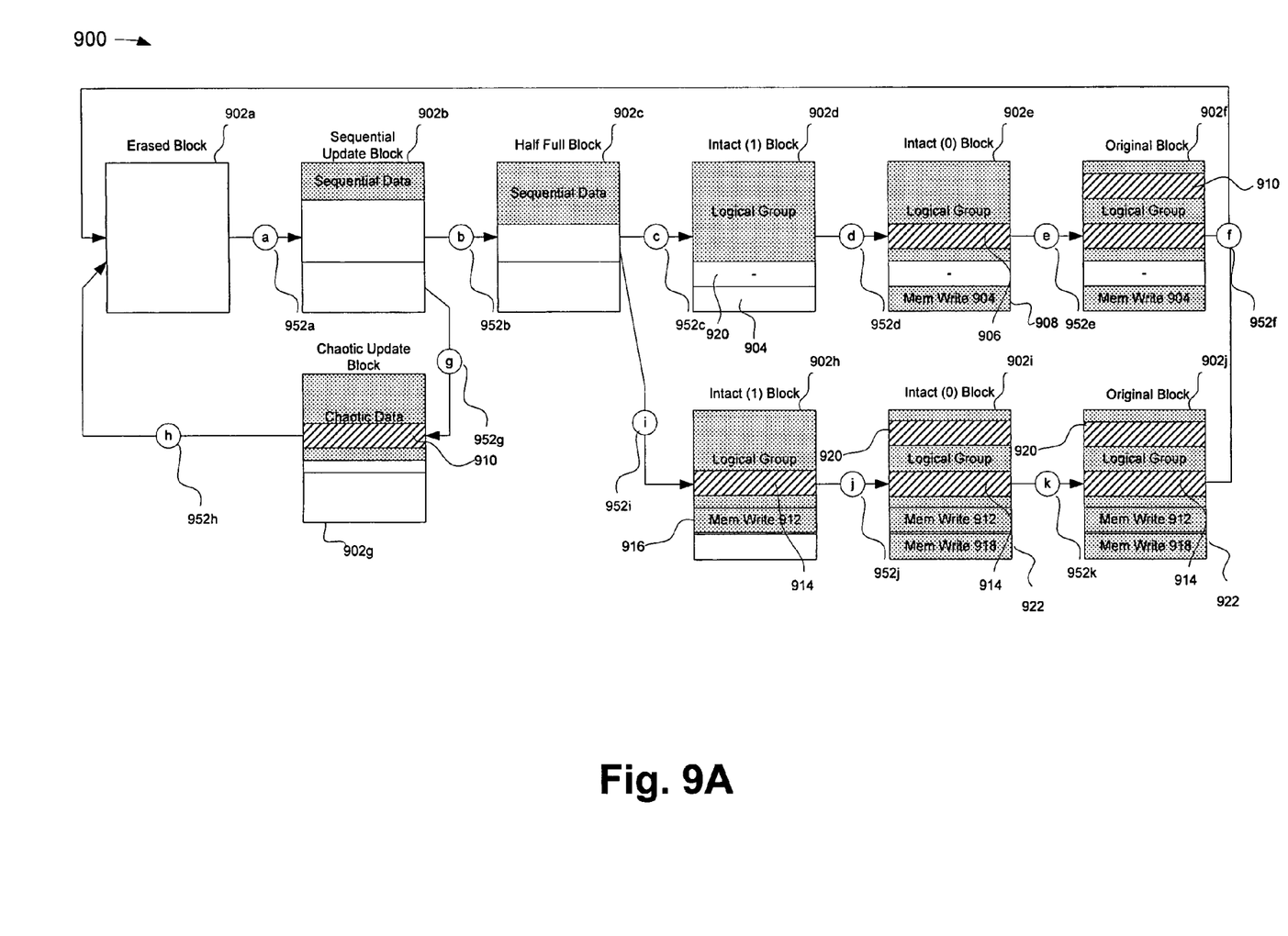
FIG. 9A illustrates a diagram of a metablock progressing through several states and performing garbage collection according to various embodiments.

FIG. 9A illustrates a metablock state diagram 900 of a metablock progressing through several states 902 and performing garbage collection according to various embodiments. The metablock states 902 (e.g., intact(1) state 902d, intact(0) state 902e) may match the logical group states shown in FIG. 8. Transactions 952 between the states, however, may not. For example, in the metablock state diagram 900, the chaotic update state 902g proceeds to the erased state 902a during the transition 952h, while in the logical group state diagram 800, the chaotic update block state 808 proceeds to the half full state 810.

The metablock state diagram 900 illustrates the progression of a metablock through the several states 902. During the progression, the metablock may be referred to using different terms that illustrate the current state of the metablock. In general, the metablock is a memory block that begins in an erased block state 902a and progresses into a sequential update block state 902b, into which data 904 (e.g., a memory write) are first written. If another memory write 906 is received, the metablock may become a chaotic update block in the chaotic update state 902g. The chaotic update state 902g may be compacted in the transition 952h, and the data written to another metablock. The metablock then continues to an erased state 902a.

After the sequential update state 902b, the valid portions (i.e., the portions not being updated) of the metablock being updated (the original block) are copied into the metablock (i.e., the blocks are garbage collected). During the progression, the metablock may be said to progress from the sequential update block state 902b (a block that includes newly written data) to a half full state 902c. The half full state 902c indicates that the first phase of garbage collection is complete, and that some portion of the logical group of the metablock is full.

The metablock then continues to the intact(1) state 902d, indicating that the logical group of the metablock is full, and that there is one available buffer portion 908. From there, a memory write 904 to an address 906 (that invalidates the data there) is written to a buffer portion 908. Once the buffer portion 908 is occupied by the memory write 904, the metablock moves to the intact(0) state 902e, indicating that there are no available buffer portions. The metablock then proceeds to an original state 902f (a block that has invalid data because an update has been received). A new memory write to an address 912 invalidates the data at the address 912, and may prompt opening a new update block.

The states 902h-902j and the transitions 952i-952k describe a possible worst case scenario for the metablock. According to an embodiment, the metablock may progress through alternative states 902-902j instead of the states 902d-902f. The transition 952i is the worst case transition between the half full state 902c and an intact(1) state (here, 902h). The metablock, while in the half full state, received a memory write 912 to an address 914 (invalidating the data there) that was buffered in a buffer portion 916.

When the metablock completes the transition 952*j* to the intact(0) state 902*i*, another memory write 918 to an address 920 (invalidating the data there) is received, and the memory write 918 is buffered to a buffer portion 922. Both buffer portions 916 and 922 are now full. The metablock then transitions to the original state 902*j*.

Figure 9B:
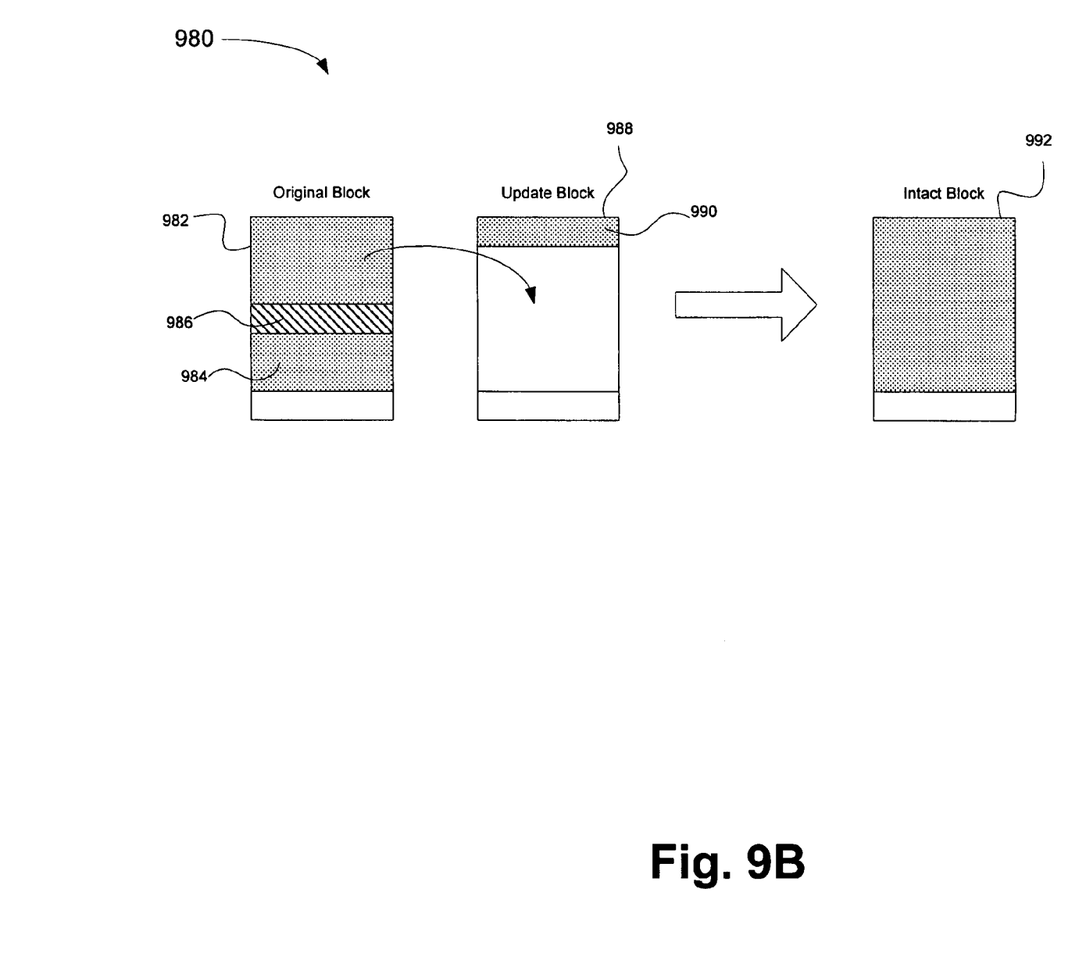
FIG. 9B generally describes a process for garbage collection using an original block and an update block to form an intact block according to an embodiment.

FIG. 9B generally describes a process for garbage collection using an original block and an update block to form an intact block according to an embodiment. The diagram 980 may be a generalization of garbage collection that occurs within the diagram 900. The process illustrated by FIG. 9B may be partitioned into phases to implement phased garbage collection, as is described regarding FIG. 9A. For example, an original block 982 includes valid data 984 and invalid data 986. An update block 988 includes update data 990. The update data 990 may be replacing the invalid data 986. During garbage collection, the valid data 984 and the update data 990 are compacted in the update block 988. After compaction, the update block 988 may be converted into an intact block 992, and the original block 982 may be erased and reallocated. The blocks 982, 988, and 990 may also include buffer portions to allow phased garbage collection, as is described regarding FIG. 9A.

Figure 10:
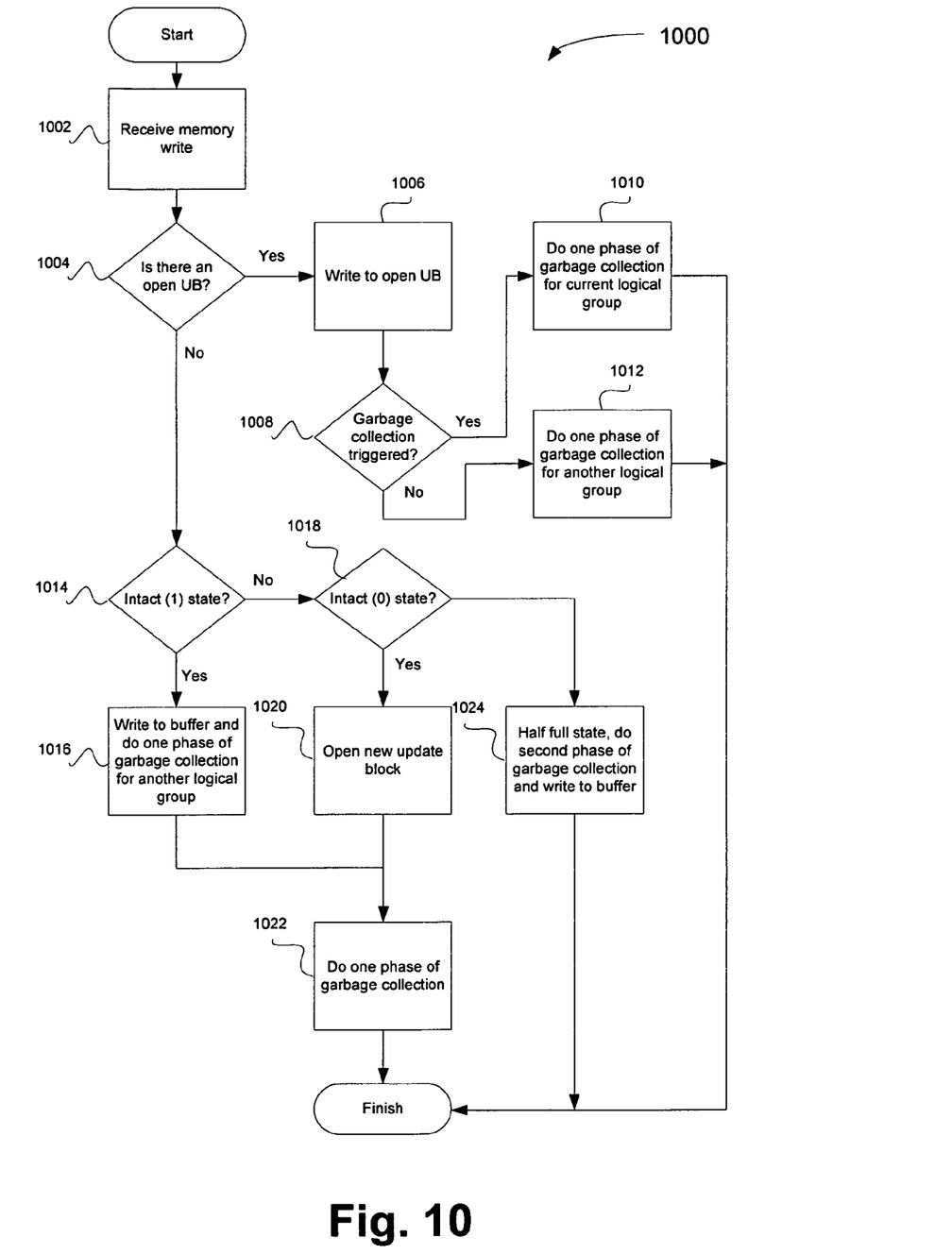
FIG. 10 is a flowchart describing a process for performing phased garbage collection according to various embodiments.

FIG. 10 is a flowchart describing a process 1000 for performing phased garbage collection according to various embodiments. Generally, the process 1000 describes receiving a memory write to a metablock including a logical group. The metablock could be in one of the states 902; the process 1000 determines the state and dictates the appropriate outcome. The diagram 900 is described in conjunction with the process 1000. The process 1000 may include two phases of garbage collection. However, it is understood that additional phases may be performed by implementing modifications described later.

In operation 1002, a memory write is received. The memory write may be written to an address of a logical group. In operation 1004, it is determined whether there is an open update block (i.e., a separate metablock) allocated to the logical group. If there is, the memory write is written to the open update block in operation 1006. If there is an open update block, the metablock may be, for example, in the original state 902*f*.

Once the memory write has been written, it is determined whether garbage collection has been triggered in operation 1008. If garbage collection has been triggered, in operation 1010, one phase of garbage collection (e.g., any phase) for the current logical group is performed. The operation 1010 may advance the update block from the sequential update state 902*b* to the half full state 902*c* via the transition 952*b*. If garbage collection has not been triggered, one phase of garbage collection for another logical group (i.e., other than in the metablock or the update block) is performed in operation 1012, and the update block may remain in the sequential update state 902*b*.

If, in operation 1004, if it is determined that there is no open update block, the process 1000 proceeds to operation 1014. In operation 1014, it is determined the metablock is in the intact (1) state 902*d*. In the intact(1) state 902*d*, the logical group (i.e., the data portion) of the metablock is full, but has one available buffer portion 908 (e.g., one of the portions 824 or 826). If the metablock is in the intact(1) state 902*d*, the memory write may be written to buffer portion 904 in operation 1016. Additionally, one phase of garbage collection for another logical group may also be performed.

If, in operation 1014, it is determined that the metablock is not in the intact(1) state 902*d*, in operation 1018, it is determined whether the metablock is in the intact(0) state 902*e*. If the metablock is in the intact(0) state 902*e*, the metablock has no available buffer portions, and the memory write cannot be written to the metablock. If the metablock is in the intact(0) state 902*e*, in operation 1020, a new update block for the metablock is opened. Additionally, after operations 1016 and 1020, one phase of garbage collection for the logical group of the metablock may be triggered in operation 1022.

In operation 1018, if the metablock is not in the intact(0) state 902*e*, in operation 1024 it is determined that the metablock is in the half full state 902*c*. The half full state indicates that a first phase of garbage collection has been performed, filling the logical group with an amount of data written during the first phase of garbage collection. Additionally, the memory write may be written to the buffer portion 904.

According to other embodiments, the process 1000 may be split into more than two phases. For example, a third buffer portion may be added to the metablock to effect a three-phase garbage collection. Alternatively, two buffer portions could be used where there is no reserve buffer portion. Using this example, an extra intact state (e.g., an intact(2) state indicating that there are two remaining buffer portions of the metablock), and an extra half-full state (e.g., instead of a half full state, a third-full and two thirds-full states are used) may be added to the state diagram 800 and to the metablock state diagram 900. For example, an intact(2) state may be added, and a one-third full state and a two-thirds full state may be substituted for the half full state 810. An additional operation may be added before the operation 1014, that determines whether the metablock is in an intact(2) state. If the metablock is in an intact(2) state, the memory write is written to a buffer portion and one phase of garbage collection is done for another logical group. If the metablock is not in an intact(2) state, the process 1000 proceeds to the operation 1014. Additional operations may be added for intact(3) states, intact(4) states, etc. Additional operations may also be added for additional intermediate states (e.g., two-thirds full, three-quarters full).

Although the foregoing embodiments have been described in some detail for purposes of clarity of understanding, the embodiments are not limited to the details provided. There are many alternative ways of implementing the embodiments. Accordingly, the disclosed embodiments are to be considered as illustrative and not restrictive, and the embodiments are not to be limited to the details given herein, but may be modified within the scope and equivalents of the appended claims. In the claims, elements and/or operations do not imply any particular order of operation, unless explicitly stated in the claims.

What is claimed is:

1. A method of operating a nonvolatile memory, comprising:

allocating a first memory block of the nonvolatile memory comprising a first logical group and a first buffer portion;

receiving a memory write command and writing data of the memory write command to a second buffer portion of a second memory block of the nonvolatile memory;

performing at least a portion of a garbage collection of a second logical group;

opening an update block for the first logical group;

performing a phased garbage collection of the first logical group;

indicating that the buffer portion is available using a first intact state;

indicating that the memory block is full using a second intact state; and indicating that a first phase of the phased garbage collection is completed using a half full state.

2. The method of claim 1, further comprising converting the memory block to an intact block after performing the phased garbage collection.

3. The method of claim 1, further comprising compacting the memory block if the memory block comprises invalid data.

4. The method of claim 1, further comprising allocating a reserve buffer portion of the memory block to store another memory write received before the second memory write command.

5. A method of operating a nonvolatile memory, comprising:

allocating a memory block of the nonvolatile memory comprising a logical group and a buffer portion and indicating that the memory block is in a sequential update state;

performing a first phase of garbage collection and indicating that the memory block is in a half full state;

performing a second phase of garbage collection and indicating that the memory block is in a first state; and writing a memory write of a memory write command to the buffer portion and indicating that the memory blocks is in a second intact state.

6. The method of claim 5, further comprising:

asserting a first timeout period before the performing the first phase of garbage collection; and asserting a second timeout period before the performing the second phase of garbage collection.

7. The method of claim 6, wherein the asserting the first timeout period is in response to receiving another memory write command; and wherein the asserting the second timeout period is in response to receiving the memory write command.

8. The method of claim 5, wherein the indicating that the memory block is in a first intact state comprises indicating that the buffer portion may be written to.

9. The method of claim 5, wherein the indicating that the memory block is in a second intact comprises indicating that no more data may be written to the memory block.

10. The method of claim 5, further comprising:

receiving another memory write updating the memory block when the memory block is in the sequential update state; and indicating that the memory block is in a chaotic update state.

11. The method of claim 10, further comprising:

compacting the memory block; and indicating that the memory block is in the sequential update state.

12. A method of operating a nonvolatile memory comprising:

allocating a memory block of the nonvolatile memory comprising a logical group and a buffer portion;

receiving a first memory write command including a first memory write to update an original block and copying the memory write to the memory block;

asserting a first timeout period in response to the receiving the first memory write and asserting a busy signal to notify a memory host of the first timeout period;

performing a first phase of a garbage collection of the memory block;

receiving a second memory write command including a second memory write to update the memory block;

asserting a second timeout period in response to the receiving the second memory write and asserting the busy signal to notify a memory host of the second timeout period;

performing a second phase of the garbage collection of the memory block; and writing the second memory write to the buffer portion;

indicating that the memory block is in a sequential update state in response to the receiving the first memory write;

indicating that the memory block is in a half full state in response to the performing the first phase of the garbage collection;

indicating that the memory block is in a first intact state in response to the performing the second phase of the garbage collection; and indicating that the memory block is in a second intact state in response to the writing the second memory write.

13. The method of claim 12, wherein the indicating that the memory block is in a first intact state comprises indicating that the buffer portion may be written to.

14. The method of claim 12, wherein the indicating that the memory block is in a second intact state comprises indicating that no more data may be written to the memory block.

15. The method of claim 12, further comprising compacting the memory block after receiving the first memory write command if the memory block has invalid data.

* * * * *